(12) United States Patent
Martens et al.

(10) Patent No.: US 9,363,950 B2
(45) Date of Patent: Jun. 14, 2016

(54) COMMINUTING DEVICE AND METHODS FOR COMMINUTING VEGETABLE MATERIAL

(75) Inventors: Petrus Johannes Martens, AK Schijf (NL); Rumoldus Adrianus Martens, SC Oudenbosch (NL)

(73) Assignee: Suokone Oy, Vuokatti (FI)

( * ) Notice: Subject to any disclaimer, the term of this patent is extended or adjusted under 35 U.S.C. 154(b) by 532 days.

(21) Appl. No.: 13/825,599

(22) PCT Filed: Sep. 21, 2011

(86) PCT No.: PCT/NL2011/050638
§ 371 (c)(1),
(2), (4) Date: May 23, 2013

(87) PCT Pub. No.: WO2012/039613
PCT Pub. Date: Mar. 29, 2013

(65) Prior Publication Data
US 2013/0240648 A1    Sep. 19, 2013

(30) Foreign Application Priority Data
Sep. 24, 2010    (NL) .................................... 2005394

(51) Int. Cl.
*B02C 18/06*    (2006.01)
*A01G 3/00*    (2006.01)
(Continued)

(52) U.S. Cl.
CPC ................ *A01G 3/002* (2013.01); *B02C 18/06* (2013.01); *B02C 18/16* (2013.01); *B02C 21/02* (2013.01)

(58) Field of Classification Search
CPC ...... A01G 23/067; A01G 3/002; B02C 18/06; B02C 18/16; B02C 21/02
USPC .......... 241/89.1, 89.3, 86.1, 86.2, 87, 101.01, 241/101.77, 101.762, 101.763, 28
See application file for complete search history.

(56) References Cited

U.S. PATENT DOCUMENTS 3,991,830 A    11/1976 Shepherd
4,193,457 A *  3/1980 Sphar .................... A01B 29/045
                                                172/464
(Continued)

FOREIGN PATENT DOCUMENTS

DE    25 44 027 B1    9/1976
SU    1250214 A2    8/1986

OTHER PUBLICATIONS

Russian Decision to Grant for corresponding Russian Patent Application No. 2013117992/13)026627) mailed Sep. 4, 2015 with English translation.
(Continued)

*Primary Examiner* — Mark Rosenbaum
(74) *Attorney, Agent, or Firm* — Merchant & Gould P.C.

(57) ABSTRACT

The invention relates to a comminuting device (1) for comminuting vegetable material (8, 18). The comminuting device has a frame (2) which can be coupled to a vehicle (4) by means of a coupling element (20), a rotor (5) which is rotatably suspended in the frame (2) and provided with treatment elements (6), and a stator (7) which is attached to the frame (2) and provided with counter elements (13). In an operating position, this stator (7) is situated near a part of the circumference of the rotor (5) so as to leave clear another part of the circumference of the rotor (5) to which organic material (8) to be comminuted can be supplied. The vegetable material (8) is comminuted by rotating the treatment elements (6) and the counter elements (13) with respect to one another. The invention also relates to methods for comminuting vegetable material (8, 18) which is aboveground and/or belowground.

15 Claims, 3 Drawing Sheets

Figure 1:
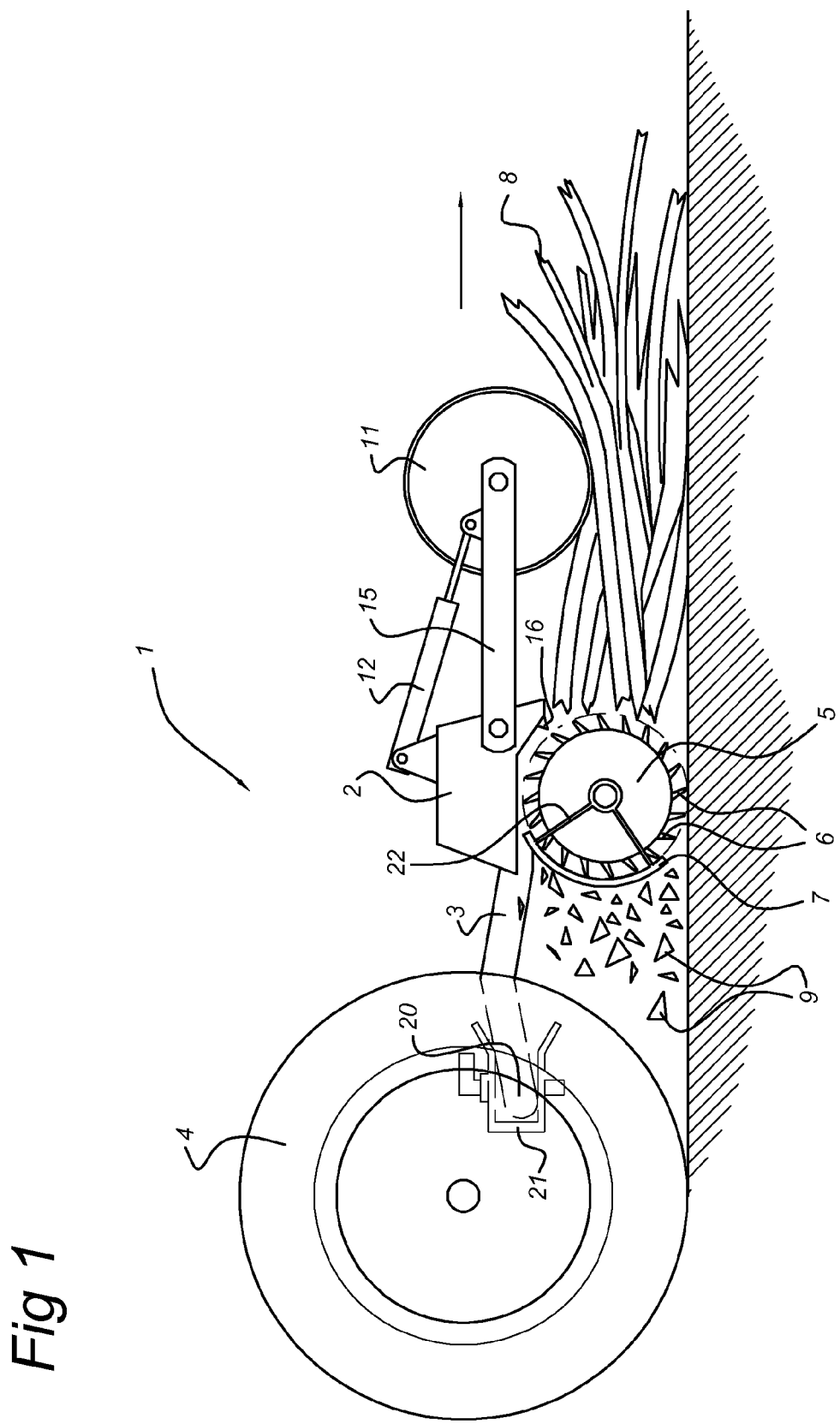

(51) Int. Cl.
*B02C 18/16* (2006.01)
*B02C 21/02* (2006.01)

(56) References Cited

U.S. PATENT DOCUMENTS 4,355,670 A * 10/1982 Ohrberg ............... A01G 23/093
144/334
5,158,126 A 10/1992 Lang 2003/0183708 A1 10/2003 Di Anna
2010/0314001 A1 * 12/2010 Kappel ................ A01G 23/067
144/334
2013/0000784 A1 * 1/2013 Holmes ................ A01G 23/067
144/334

OTHER PUBLICATIONS

International Search Report for corresponding International Patent Application No. PCT/NL2011/050638 mailed Nov. 30, 2011.

* cited by examiner

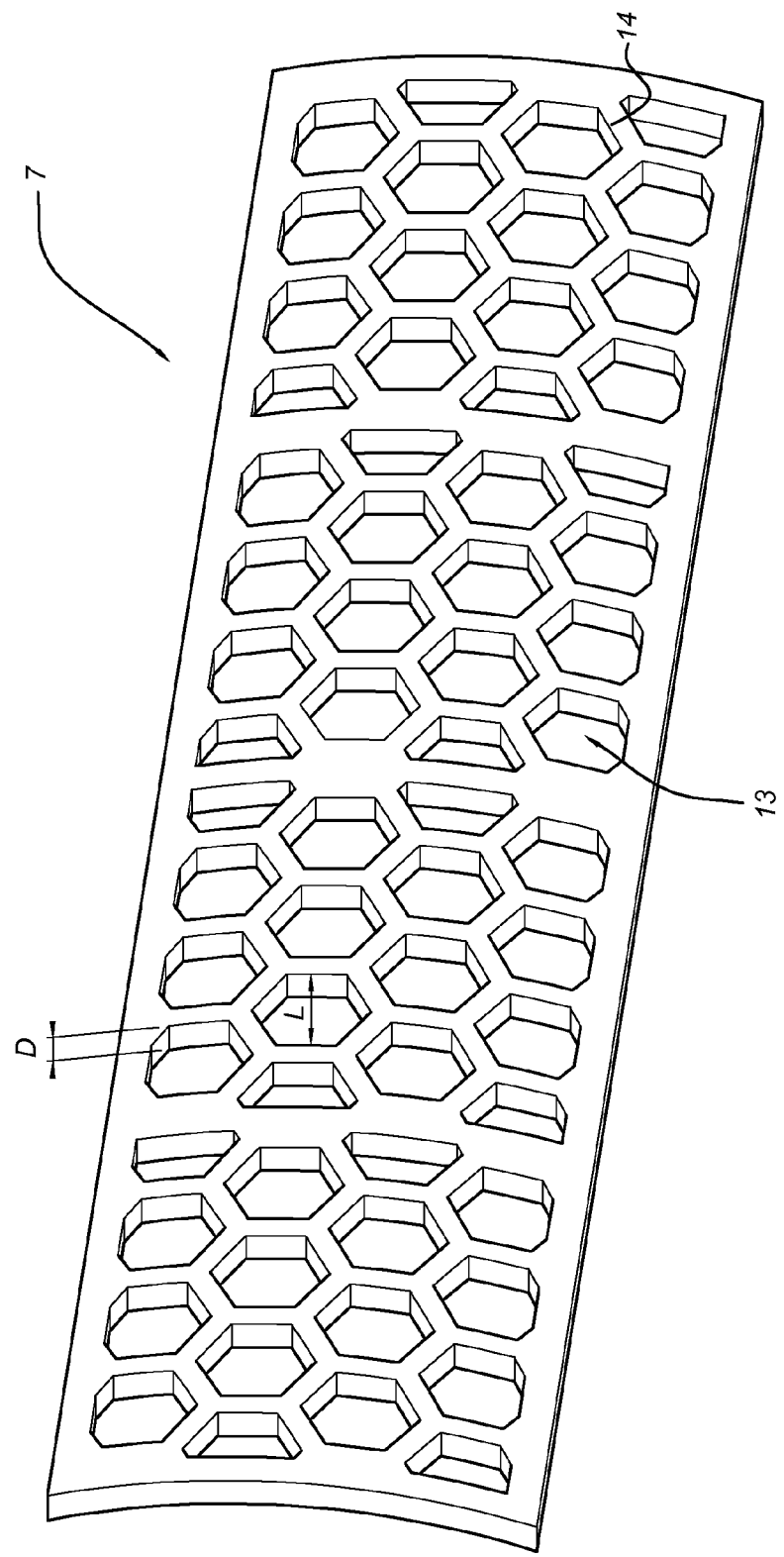

COMMINUTING DEVICE AND METHODS FOR COMMINUTING VEGETABLE MATERIAL

This application is a National Stage Application of PCT/NL2011/050638, filed 21 Sep. 2011, which claims benefit of Serial No. 2005394, filed 24 Sep. 2010 in the Netherlands and which applications are incorporated herein by reference. To the extent appropriate, a claim of priority is made to each of the above disclosed applications.

The invention relates to a comminuting device for comminuting organic material, in particular vegetable material, comprising a frame which can be coupled to a vehicle, such as an agricultural tractor, by means of a coupling element, a rotor which is rotatably suspended in the frame and provided with treatment elements, a stator attached to the frame and provided with counter elements, which stator is, in an operating position, situated near a part of the circumference of the rotor so as to leave clear another part of the circumference of the rotor, to which other part of said rotor organic material to be comminuted can be supplied, by means of which treatment elements of the rotor and counter elements of the stator a comminuting action is performed on said material when they are rotated with respect to one another, wherein at least a part of the stator can be moved between different positions with respect to the rotor.

The invention furthermore relates to methods for using the comminuting device according to the present invention for comminuting vegetable material which is aboveground, such as branches, and/or belowground, such as root stumps or stubs.

Such a comminuting device for comminuting vegetable material is known. The treatment elements, such as cutters and/or teeth, with which the rotor is provided, are chosen depending on whether the vegetable material to be comminuted is belowground or aboveground. In the case that the vegetable material to be comminuted is situated partially belowground, such as for example in the case of root stumps or stubs, narrow cutters will generally be opted for, so that the resistance which the cutters experience while comminuting belowground does not become so great as to result in for example the rotor becoming jammed or the comminuting device becoming overloaded. This could, for example, result in capacity limitation of the comminuting device or damage thereto. In the case that the vegetable material to be comminuted is at least partly aboveground, such as for example in the case of trunks and/or branches, wide cutters are generally opted for in order to achieve a comminution such that the comminuted material has to be worked into the ground after comminution.

A drawback of the above-described comminuting devices is that, for comminuting vegetable material which is both belowground and aboveground, either a comminuting device for aboveground comminution and a comminuting device for belowground comminution are required, or a comminuting device is required in which at least the treatment elements of the rotor can be exchanged.

The use of comminuting devices which are suitable specifically for belowground or aboveground comminution of vegetable material, entails a significant investment which may have a negative effect on the comminuting costs to a consumer.

In order to be able to use the same comminuting device for both aboveground and belowground comminution, at least the cutters of the rotor will have to be exchangeable. Due to the fact that exchanging the cutters is labour-intensive, this will have a negative effect on the total operating costs of the comminuting device. In addition, this will result in a limited flexibility regarding the use of the comminuting device, as it will not be obvious to exchange a rotor having wide cutters with a rotor having narrow cutters. The detachable cutters which are required for such a modification of the rotor can easily be lost, resulting in sets of wide or narrow cutters belonging to a rotor becoming incomplete. If the rotor cannot be provided with a complete set of wide or narrow cutters, the performance of the device will suffer as a result.

It is an object of the present invention to provide a comminuting device which overcomes the abovementioned drawbacks or at least reduces them. It is a further object of the present invention to provide methods for using the comminuting device according to the present invention for comminuting vegetable material which is aboveground, such as wood, and/or belowground, such as root stumps or stubs.

At least one of these objects is achieved by a comminuting device according to the present invention, wherein the stator can be moved between different positions with respect to the rotor by rotation about the center line of the rotor. In a position in which the stator is situated opposite and near a part of the circumference of the rotor which faces the coupling element, the comminuting device is in a configuration in which the stator and the rotor can cooperate during comminution of the vegetable material. In this configuration, the comminuting device is particularly suitable for comminuting vegetable material which is substantially aboveground, as the rotor cannot penetrate the ground or hardly at all due to the position of the stator. As a result thereof, vegetable material which is substantially belowground cannot be comminuted, or hardly at all.

In another position, the stator is essentially situated between the rotor and the frame so as to leave clear at least the abovementioned part of the circumference of the rotor which faces the coupling element. In this configuration, the comminuting device is particularly suitable for comminuting vegetable material which is substantially belowground, as the rotor is not hindered from penetrating the ground due to the position of the stator. As a result thereof, vegetable material which is situated substantially belowground, can be comminuted.

In both configurations, a part of the circumference of the rotor which faces away from the coupling element and to which organic material to be comminuted can be supplied is clear. An advantage of this embodiment of the comminuting device according to the invention is that, in both configurations, the stator is placed opposite and near a part of the circumference of the rotor. As a result thereof, the vegetable material can be comminuted by cooperation between the stator and the rotor in both configurations of the comminuting device.

Due to the measure explained above, the comminuting device can therefore be moved between a configuration in which vegetable material can be comminuted which is situated substantially aboveground and a configuration in which vegetable material can be comminuted which is situated substantially belowground, thus creating a dual function of the comminuting device. After all, it is now possible to comminute both vegetable material which is substantially aboveground and vegetable material which is substantially belowground using the same comminuting device without having to replace the cutters of the rotor. As a result of the cooperation between the narrow cutters of the rotor and the counter elements of the stator, a comminution of the vegetable material is achieved which is at least comparable to the comminution which can be achieved by a comminuting device having a rotor which is provided with wide cutters but does not have a stator according to the present invention. Thus, it is possible to achieve a significant economic advantage.

Furthermore, it is not necessary to use different specific comminuting devices for comminuting vegetable material which is both aboveground and belowground. By not having to provide a so-called aboveground comminuting device, a significant cost reduction can be achieved which may have a positive effect on the costs for the consumer for comminuting vegetable material which is both aboveground and belowground.

In an embodiment of the comminuting device according to the present invention, the stator is curved, at least on a surface thereof facing the rotor, and, in the operating position, encloses a curved space with the opposite part of the rotor, through which curved space the material can be passed during comminution. By giving at least one surface of the stator, which faces the rotor in the active position thereof, substantially the same curvature as an outer surface of the rotor, the vegetable material, as a result of the cooperation between the narrow cutters of the rotor and the counter elements of the stator, can be subjected to the comminuting operation many times while passing through the enclosed curved space. Consequently, a comminution of the vegetable material can be achieved which is at least comparable to the comminution which can be achieved by a comminuting device with a rotor which is provided with wide cutters, but does not have a stator according to the present invention.

In an embodiment of the comminuting device according to the present invention, the stator is configured as a curved plate or a curved pipe part which comprises a sector of a circle having an angle of 30 to 60 degrees. By matching the curvature of the stator as much as possible with the curvature of the rotor, the curved space enclosed between the stator and rotor can be made as large as possible in the circumferential direction of the rotor. As a result thereof, the vegetable material to be comminuted can be subjected to the comminuting action resulting from the cooperation between the cutters of the rotor and the counter elements of the stator as long as possible in order to optimize the efficiency of comminuting vegetable material.

In an embodiment of the comminuting device according to the present invention, the stator is configured to have through-openings. As a result thereof, a fraction of the comminuted vegetable material which can be passed through the through-openings, can at least end up outside the curved space which is enclosed between the rotor and the stator in the active position of the stator.

The dimensions of the through-openings determine the dimensions of the fraction of comminuted vegetable material which can be passed to the outside of the comminuting device and can end up on the soil to be treated, for example a piece of land which has to be made ready for building.

If the dimensions of the through-openings are too large, the fraction which has been allowed to pass through may be too large to be incorporated into the soil to be treated and/or to be processed. It may then be necessary to subject the fraction which is already present on the soil to an additional comminuting treatment. It is clear that this is an undesirable situation, as an additional treatment step will result in an increase of the treatment costs.

However, the dimensions of the through-openings should not be too small either, as this could result in a capacity limitation for the comminuting device. The amount of vegetable material to be comminuted passing through will be more limited because of the fact that a fraction of the already comminuted material which is too large cannot be passed to the outside through the through-openings and will therefore remain in the comminuting device until it has been comminuted sufficiently. This means that the fraction of already comminuted vegetable material which is too large will possibly have to be passed through the enclosed curved space several times before it has been comminuted sufficiently and can be passed to the outside through the through-openings.

In an embodiment of the comminuting device according to the present invention, the openings are hexagonal in shape. Such a shape is advantageous because the edges of the through-openings form several counter elements of the stator which are oriented in different directions. In cooperation with the cutters of the rotor, the hexagonal through-openings may have an effective comminuting effect on the vegetable material. A suitable size of the hexagonal openings, which is defined in this application by the distance between two opposite sides of the hexagon, is in a range of approximately 4 cm to 20 cm, preferably in a range of approximately 6 cm to 10 cm and is preferably approximately 8 cm.

In an embodiment of the comminuting device according to the present invention, the counter elements comprise metal parts which are situated along the circumference of the openings. The metal parts can be provided on the edges of the openings in order to improve the resistance to wear of the counter elements. In order to reduce the costs of the stator, it is possible to use ceramic materials of great hardness instead of metal parts on the edges of the openings. Such a ceramic material may, for example, be sintered tungsten carbide.

In an embodiment of the comminuting device according to the present invention, the treatment elements comprise metal parts which are oriented tangentially with respect to the rotor. Such a metal part may form the head of a cutter of the rotor. By using tangentially directed cutter heads, comminution can be improved further due to the fact that the contact surface with the vegetable material can be enlarged. In order to increase the resistance to wear of the cutter heads, sintered tungsten carbide may, for example, be used.

In an embodiment of the comminuting device according to the present invention, a side of the frame which faces away from the coupling element is provided with a support roller which can be rolled over ground to be treated, which support roller has a center line of rotation which runs parallel to the center line of rotation of the rotor. When the stator is situated opposite and near a part of the circumference of the rotor which faces the coupling element, the comminuting device is suitable for comminuting vegetable material which is aboveground, such as trunks and/or branches. By means of the support roller, the height at which the rotor can be positioned above the ground to be treated can be determined. When the stator is situated essentially between the rotor and the frame so as to leave clear at least the abovementioned part of the circumference of the rotor which faces the coupling element, the rotor provided with cutters will be positioned substantially above the ground to be treated. A further function of the support roller is pushing down the vegetable material to be comminuted so that it can be passed to the clear part of the rotor in an efficient manner.

When the stator is situated essentially between the rotor and the frame, it is possible to use the support roller to determine how deep the rotor which is provided with cutters will penetrate into the ground to be treated in order to be able to comminute the vegetable material which is situated substantially belowground, such as for example root stumps and/or stubs.

According to a further aspect of the present invention, a method is provided for the use of the comminuting device according to the present invention for comminuting vegetable material, such as wood, which is substantially aboveground, comprising the following steps:

moving the stator into a position in which the stator is situated opposite a part of the circumference of the rotor which faces the coupling element, setting the rotor in rotary motion, supplying vegetable material in the space between the rotor and the stator, comminuting the vegetable material by means of the treatment elements and counter elements which move with respect to one another, and removing the comminuted vegetable material from said space.

A further method according to the present invention comprises the following steps:

moving the comminuting device over the ground, wherein the part of the circumference of the rotor which faces away from the coupling element is left clear and is directed towards the vegetable material to be comminuted, moving the comminuting device closer to the vegetable material to be comminuted, and, during this process, supplying the vegetable material to the space between the rotor and stator by moving the comminuting device over the ground.

A final method according to the present invention is provided for the use of the comminuting device according to the present invention for comminuting vegetable material, such as root stumps and/or stubs, which is situated substantially belowground or in a pit, comprising the following steps:

moving the stator into a position in which the stator is essentially situated between the rotor and the frame so as to leave clear at least that part of the circumference of the rotor which faces the coupling element and that part of the circumference of the rotor which faces away from the coupling element, setting the rotor in rotary motion, and moving at least the underside of the rotor over the vegetable material.

Although the present invention will now be described with reference to a specific embodiment, the invention is not limited thereto. The invention is described by means of measures, in which case explicit advantages may be mentioned, but in which case implicit advantages may also apply. The subject matter of the invention of this application or of a divisional application may relate to each of these measures, some combinations of which are described and/or illustrated explicitly in this description, but which may also be described implicitly. Although the figures show explicit combinations of measures, it will be clear to those skilled in the art that a number of the measures can also be applied separately.

FIG. 1 diagrammatically shows a side view of an embodiment of the comminuting device according to the present invention in the operating state, wherein the stator is situated opposite and near a part of the circumference of the rotor which faces the coupling element.

Figure 2:
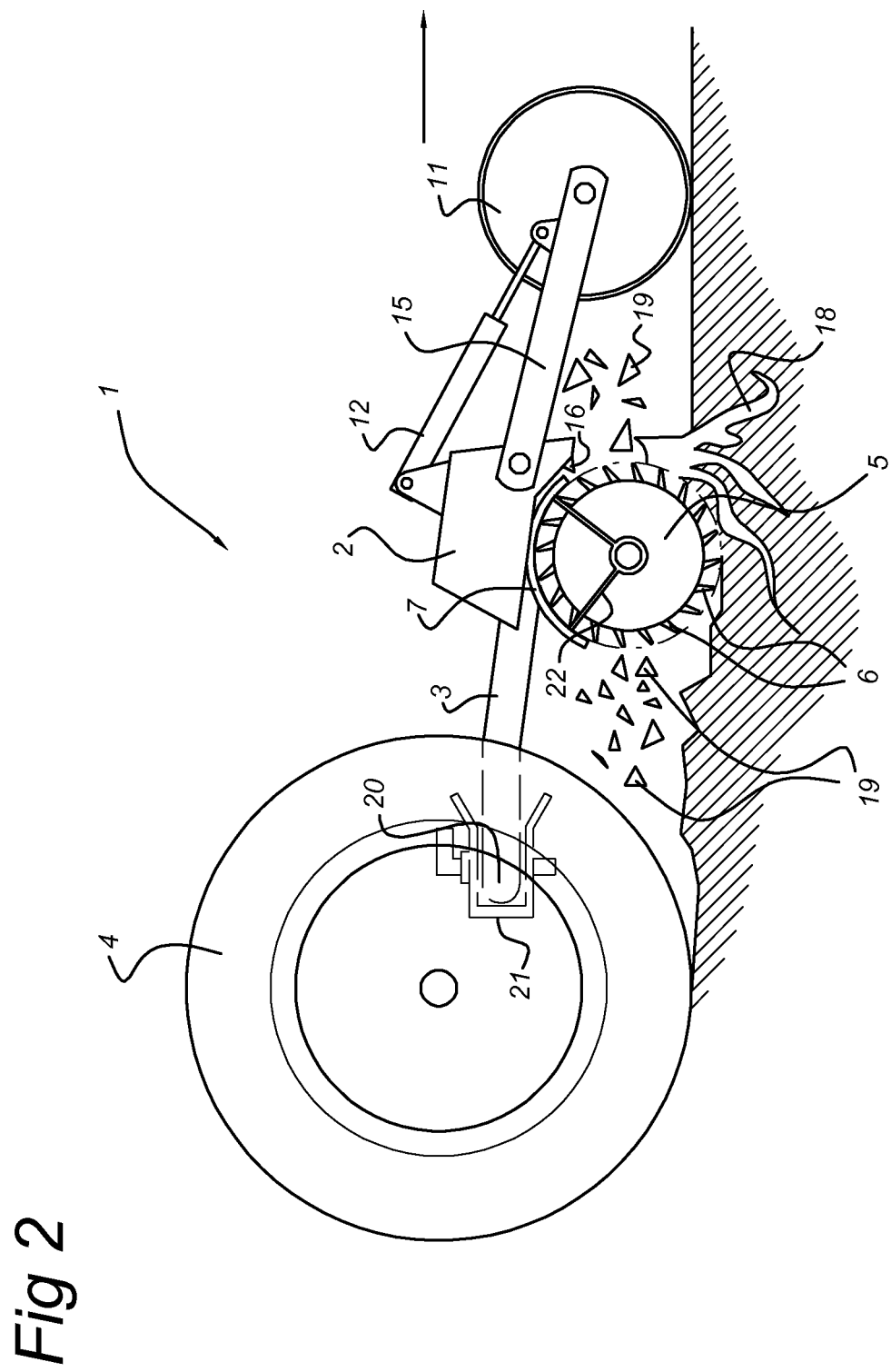

FIG. 2 diagrammatically shows a side view of an embodiment of the comminuting device according to the present invention in the operating state, wherein the stator is situated between the rotor and the frame so as to leave clear at least that part of the circumference of the rotor which faces the coupling element and that part of the circumference of the rotor which faces away from the coupling element to which vegetable material to be comminuted can be supplied.

FIG. 3 shows a perspective view of the stator according to the present invention.

The figures are not necessarily drawn to scale. Identical or similar parts may be denoted by the same reference numerals in the various figures.

FIG. 1 diagrammatically shows a side view of an embodiment of the comminuting device 1 for comminuting organic material 8, 18, in particular vegetable material. The comminuting device 1 comprises a frame 2 which, by means of a coupling element 20, can be coupled to a receiving device 21 of a vehicle 4, such as an agricultural tractor, of which only a wheel is illustrated diagrammatically in FIG. 1. A rotor 5, which is provided with treatment elements 6, is rotatably suspended in the frame 2. The rotor 5 can be made to rotate by means of a drive member 3, such as a drive shaft which is coupled, for example, to the motor of the vehicle 4.

The treatment elements 6 which are used in the comminuting device 1 according to the present invention are, for example, cutters which are suitable for efficiently comminuting vegetable material 8, 18 which is both aboveground and belowground. This means that the dimensions of the cutters 6 have been chosen such that the resistance which they encounter during comminution of vegetable material 18 which is situated substantially belowground is not sufficiently large to result in, for example, the rotor 5 becoming jammed or the comminuting device 1 becoming overloaded, which could, for example, result in a capacity limitation of the comminuting device 1 or damage thereto.

The cutters 6 may comprise metal parts which are oriented tangentially with respect to the rotor 5. Such a metal part may form the head of a cutter 6 of the rotor 5. By using tangentially oriented cutter heads, the comminution can be improved further because the contact surface with the vegetable material 8 can be enlarged. In order to increase the resistance to wear of the cutter heads, it is possible to use, for example, sintered tungsten carbide.

A stator 7 which is provided with counter elements 13, as is illustrated in FIG. 3, is also attached to the frame 2. The stator 7 is attached to the frame 2 in such a manner that at least a part of the stator 7 is moved between a position in which the stator 7 is situated opposite and near a part of the circumference of the rotor 5 which faces the coupling element 20 and a position in which the stator 7 is situated between the rotor 5 and the frame 2 so as to leave clear at least that part of the circumference of the rotor 5 which faces the coupling element 20 and that part of the circumference of the rotor 5 which faces away from the coupling element 20 to which vegetable material to be comminuted can be supplied. The latter situation will be explained in more detail in FIG. 2.

In the embodiment illustrated in FIG. 1, the stator 7 is connected to a frame 22 which is rotatably connected to the rotor 5. By rotating the frame 22 about the center line of the rotor 5, the stator 7 is moved, like a visor as it were, from a position in which the stator 7 is positioned opposite and near the part of the circumference of the rotor 5 which faces the coupling element 20 to a position in which the stator 7 is essentially situated between the rotor 5 and the frame 2, as is illustrated in FIG. 2. It will be clear to those skilled in the art that the stator 7 can be movably attached to the frame 2 in many ways.

FIG. 1 shows the comminuting device 1 in which the stator 7 is in the active position opposite and near a part of the circumference of the rotor 5 which faces the coupling element 20. In this case, the comminuting device 1 is particularly suitable for comminuting vegetable material 8 which is substantially aboveground, such as trunks and/or branches. FIG. 1 shows that, in the active position, the stator 7 surrounds at least a part of the circumference of the rotor 5 while a part of the circumference of the rotor 5 which faces away from the coupling element 20 is left clear. The vegetable material 8 to be comminuted can be supplied to this clear part of the circumference of the rotor 5.

On that side of the frame 2 which faces away from the coupling element 20, a support roller 11 is attached via a connecting element 15 and can be rolled over a ground to be treated. The support roller 11 has a center line of rotation which is parallel to the center line of rotation of the rotor 5. By means of a control element 12, for example a piston/spring system, the position of the connecting element 15 with respect to the ground can be determined. This makes it possible to set the height at which the rotor 5 is positioned above the ground to be treated. When the stator 7 is in the active position, the rotor 5 which is provided with cutters 6 will be positioned substantially above the ground to be treated.

The vegetable material 8 to be comminuted can be supplied to the comminuting device 1 by moving it over the ground in the direction of the arrow, wherein the clear part of the rotor 5 faces the vegetable material 8 to be comminuted. FIG. 1 shows how the support roller 11 in this case pushes down the vegetable material 8 to be comminuted so that it can be supplied efficiently to the clear part of the rotor 5 where it is carried along by means of the cutters 6 to the curved space which is enclosed by the stator 7 and the rotor 5. When supplying vegetable material 8 to the clear part of the circumference of the rotor 5, comminution of the vegetable material 8 takes place as a result of the cooperation between the cutters 6 and a counter member 16, for example an optionally sharp edge.

Due to the cooperation between the cutters 6 of the rotor 5 and the counter elements 13 of the stator 7 which, in an operating position, rotate with respect to one another, a comminuting action on the vegetable material 8 to be comminuted is carried out. In an embodiment of the stator 7 as illustrated in FIG. 3, the counter elements 13 are through-openings in the stator 7 which are hexagonal in shape. A fraction of the at least partly comminuted vegetable material 9 which can be passed through the through-openings will land on the ground. The remaining fraction of the vegetable material will be subjected to a further comminuting operation of the cutters 6 and the through-openings 13 in the enclosed curved space until it can be passed outside the comminuting device 1 by the through-openings 13.

FIG. 2 diagrammatically shows a side view of an embodiment of the comminuting device 1 according to the present invention in the operating state, wherein the stator 7 is situated between the rotor 5 and the frame 2 so as to leave clear at least that part of the circumference of the rotor 5 which faces the coupling element 20 and that part of the circumference of the rotor 5 which faces away from the coupling element 20 to which vegetable material 18 to be comminuted can be supplied. In the configuration of the comminuting device 1 as illustrated in FIG. 2, this is particularly suitable for comminuting vegetable material 18 which is situated substantially belowground because the rotor 5 is not hampered when penetrating into the ground due to the position of the stator 7. As a result thereof, vegetable material 18 which is situated substantially belowground can be comminuted.

An advantage of the embodiment of the comminuting device 1 as illustrated in FIG. 2 is the fact that, during comminution, the stator 7 and rotor 5 can cooperate, which may thus result in a more efficient comminution of the vegetable material 18 which is situated substantially belowground.

By means of the control element 12, the position of the connecting element 15 with respect to the ground is set in such a manner that the rotor 5 can penetrate into the ground to be treated to a certain depth. The vegetable material 18 which is substantially belowground can be comminuted by moving the underside of the rotating rotor 5 over it in the direction of the arrow. The comminuted vegetable material 19 then lands directly on the ground.

FIG. 3 shows a perspective view of the stator 7 according to the present invention. In an embodiment according to the present invention, the stator 7 is configured as a curved plate or a curved pipe part which comprises a sector of a circle with an angle of 30 to 60 degrees. By matching the curvature of the stator 7 as much as possible with the curvature of the rotor 5, the curved space enclosed between the stator 7 and rotor 5 can be made as large as possible in the circumferential direction of the rotor 5.

As a result thereof, the vegetable material 8 to be comminuted can be subjected to the comminuting action resulting from the cooperation between the cutters 6 of the rotor 5 and the counter elements 13 of the stator 7 for as long as possible in order to optimize the efficiency of comminuting the vegetable material 8.

As is illustrated in FIG. 3, the stator 7 comprises counter elements 13 which are configured as through-openings. As a result thereof, a fraction of the comminuted material 19 which can be passed through the through-openings 13, may land outside the curved space which is enclosed between the stator 7 and rotor 5 in the active position of the stator 7.

The dimensions of the through-openings determine the dimensions of the fraction of the comminuted vegetable material 9 which can be passed to the outside of the comminuting device 1 and lands on the ground to be treated.

If the dimensions of the through-openings are too large, the fraction which has passed through may be too large to be incorporated into the ground to be treated and/or to be processed. It may then be necessary to subject the fraction 9 which is already on the ground to an additional comminuting operation. It is clear that this is an undesirable situation, as an additional treatment step will result in an increase in the treatment costs.

However, the dimensions of the through-openings 13 should not be too small, as this could result in a capacity limitation for the comminuting device. The passage of the vegetable material 8 to be comminuted will be more limited because an excessively large fraction of the already comminuted material 9 cannot pass through the through-openings 13 to the outside and will therefore remain inside the comminuting device until it has been comminuted sufficiently. This means that the excessively large fraction of the already comminuted vegetable material 9 would have to be passed through the enclosed curved space several times before it has been comminuted sufficiently and can be passed to the outside through the through-openings 13.

As is illustrated in FIG. 3, the through-openings 13 have a hexagonal shape. Such a shape is advantageous because the edges 14 of the through-openings 13 form several counter elements of the stator which are oriented in different directions. In cooperation with the cutters 6 of the rotor 5, the hexagonal through-openings 13 can perform an effective comminuting action on the vegetable material 8. A suitable dimension L of the hexagonal openings which, in this application, is defined by the distance between two opposite sides of the hexagon, is in a range of approximately 4 cm to 20 cm, preferably in a range of approximately 6 cm to 10 cm, and is preferably approximately 8 cm. The thickness D of the stator 7 is in a range of approximately 1.5 cm to approximately 4 cm and is preferably 2.5 cm.

The hexagonal through-openings 13 may comprise metal parts which are situated on the circumference of the openings 13. The metal parts can be provided on the edges 14 of the openings 13 in order to improve the resistance to wear of the counter elements. Instead of metal parts, it is also possible to use ceramic materials of great hardness on the edges 14 of the openings 13 in order to reduce the costs of the stator 7. Such a ceramic material may, for example, be sintered tungsten carbide.

The present invention is not limited to the embodiments which have been described above as non-limiting examples. The scope of protection is determined by the meaning of the following claims, which allows for numerous modifications.

The invention claimed is:

1. Comminuting device for comminuting organic material, the comminuting device comprising:
a frame which can be coupled to a vehicle by means of a coupling element,
a rotor which is rotatably suspended in the frame and provided with treatment elements, the rotor having a circumference,
a stator attached to the frame and provided with counter elements, which stator is, in an operating position, situated near a part of the circumference of the rotor so as to leave unobstructed another part of the circumference of the rotor, to which other part of said rotor organic material to be comminuted can be supplied, by means of which treatment elements of the rotor and counter elements of the stator a comminuting action is performed on said material when the treatment elements and the counter elements are rotated with respect to one another, wherein at least a part of the stator can be moved between different positions with respect to the rotor, and wherein the stator can be moved between different positions with respect to the rotor by rotation about the center line of the rotor.

2. Comminuting device according to claim 1, wherein the stator can be moved between a first position in which the stator is situated opposite and near a part of the circumference of the rotor which faces the coupling element, and a second position in which the stator is essentially situated between the rotor and the frame so as to leave unobstructed at least the part of the circumference of the rotor which faces the coupling element.

3. Comminuting device according to claim 1, wherein a part of the circumference of the rotor which faces away from the coupling element is unobstructed, to which part organic material to be comminuted can be supplied.

4. Comminuting device according to claim 1, wherein the stator comprises a curved surface facing the rotor, and, in the operating position, encloses a curved space with a corresponding part of the rotor, through which curved space the organic material can be passed during comminution.

5. Comminuting device according to claim 1, wherein the stator is configured as a curved plate or a curved pipe part which comprises a sector of a circle having an angle of 30 to 60 degrees.

6. Comminuting device according to claim 1, wherein the stator is provided with through-openings.

7. Comminuting device according to claim 6, wherein the openings are hexagonal in shape.

8. Comminuting device according to claim 6, wherein the counter elements comprise metal parts which are situated along perimeters of the openings.

9. Comminuting device according to claim 1, wherein the treatment elements comprise metal parts which are oriented tangentially with respect to the rotor.

10. Comminuting device according to claim 1, wherein the frame is provided with a support roller which can be rolled over ground to be treated, which support roller has a center line of rotation which runs parallel to the center line of rotation of the rotor.

11. Method for the use of the comminuting device according to claim 1 for comminuting vegetable material substantially aboveground, comprising the following steps:
moving the stator into a position in which the stator is situated opposite a part of the circumference of the rotor which faces the coupling element,
setting the rotor in rotary motion,
supplying vegetable material in the space between the rotor and the stator,
comminuting the vegetable material by means of the treatment elements and counter elements which move with respect to one another, and
removing the comminuted vegetable material from said space.

12. Method according to claim 11, comprising the following steps:
moving the comminuting device over the ground, wherein the part of the
circumference of the rotor which faces away from the coupling element is left unobstructed and is directed towards the vegetable material to be comminuted,
moving the comminuting device closer to the vegetable material to be comminuted, and
during this process, supplying the vegetable material to the space between the rotor and stator by moving the comminuting device over the ground.

13. The method of claim 11, wherein the vegetable matter comprises wood.

14. Method for the use of the comminuting device according to claim 1 for comminuting vegetable material situated substantially belowground or in a pit, comprising the following steps:
moving the stator into a position in which the stator is essentially situated between the rotor and the frame so as to leave unobstructed at least that part of the circumference of the rotor which faces the coupling element and that part of the circumference of the rotor which faces away from the coupling element,
setting the rotor in rotary motion, and
moving at least the underside of the rotor over the vegetable material.

15. The method of claim 14, wherein the vegetable matter comprises root stumps.

* * * * *